United States Patent [19]

McWhorter

[11] 3,730,168
[45] May 1, 1973

[54] MANOMETER
[75] Inventor: Daniel M. McWhorter, Arlington Heights, Ill.
[73] Assignee: The Kendall Company, Boston, Mass.
[22] Filed: Sept. 10, 1970
[21] Appl. No.: 71,232

Related U.S. Application Data
[63] Continuation-in-part of Ser. No. 653,548, July 14, 1967, abandoned.

[52] U.S. Cl. ............... 128/2 F, 73/388 R, 128/2.05 D
[51] Int. Cl. ............................................... A61b 5/10
[58] Field of Search .................... 128/2, 2.05; 73/388

[56] References Cited

UNITED STATES PATENTS

| | | | |
|---|---|---|---|
| 2,866,453 | 12/1958 | Jewett | 128/2.05 D |
| 3,183,722 | 5/1965 | Unger et al. | 73/388 R |
| 3,526,218 | 9/1970 | Reiss | 128/2.05 D X |
| 3,062,202 | 11/1962 | Hyman et al. | 128/2.05 D |

OTHER PUBLICATIONS

Surgical Equipment; May–June 1935; Vol. 2, No. 3, page 12.

*Primary Examiner*—Delbert B. Lowe
*Attorney*—Robert D. Chodera and James I. Fawcett

[57] ABSTRACT

A manometer for measuring liquid pressure having a channel which opens into an attaching device for connecting the channel to liquid under pressure, said attaching device including a conduit which provides a path of flow for said liquid into the channel. The conduit has a needle for introducing liquid into the conduit at one end thereof, a closure at the other end thereof which includes a valve or slit for opening said other end of the conduit to permit drainage of liquid therefrom, and an opening in said conduit through which liquid may enter the channel from the conduit. Liquid pressure is indicated by the amount of travel of the liquid in said channel.

15 Claims, 6 Drawing Figures

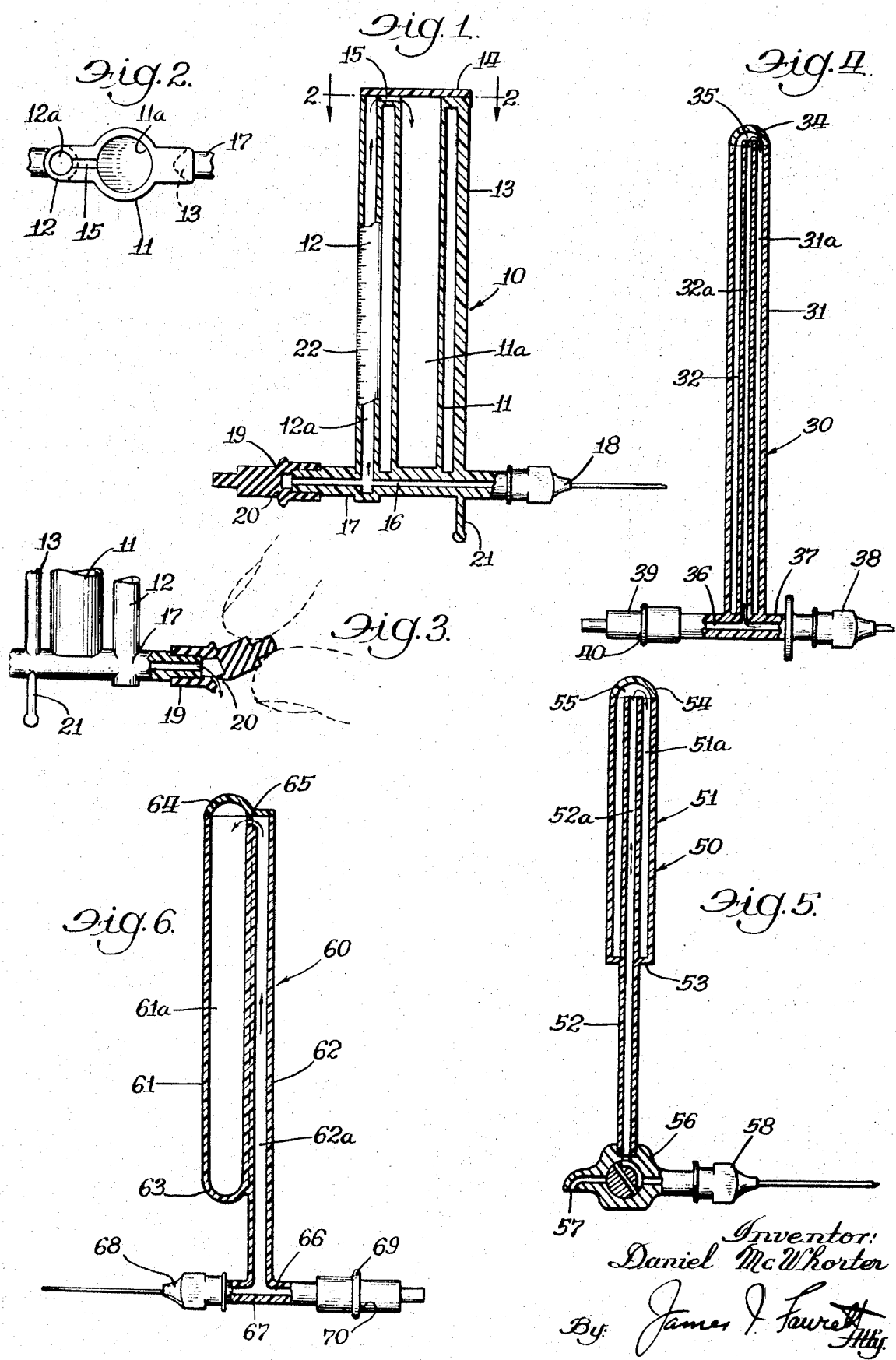

MANOMETER

This application is a continuation-in-part of co-pending application Ser. No. 653,548, filed July 14, 1967, now abandoned.

BACKGROUND OF THE INVENTION

This invention is concerned with a device for measuring liquid pressure.

Most manometers in the past have worked on the principle of balancing the weight of a column of liquid per unit area against the pressure per unit area. Some manometers, specifically those which are designed to measure liquid pressure of various body fluids, are open at the column top, while others have utilized a closed end which has been substantially evacuated. Other manometers, which for the most part are employed for measuring relatively high liquid pressures, have utilized a coil or partial coil which is filled with liquid and tends to unwind as the pressure on the liquid increases. In certain areas of the medical field, open tube manometers are used, as for instance in measuring the pressure of spinal fluid.

Open tube manometers presently utilized are somewhat inconvenient and have many disadvantages. The liquid in such manometers must rise until the weight per unit area balances the pressure per unit area. As a result, the thin tubes are sometimes inconveniently long, being of the order of 60 centimeters in length. The weight of the lengthy tube and the fact that the spinal manometer provides a pivot axis may present a top-heavy instrument which is difficult to manipulate and oftentimes requires the services of a second person to hold it in position.

Furthermore, present manometers, whether of the open or closed tube variety, do not provide convenient means for drawing off from the manometer a portion of the liquid whose pressure is being measured.

SUMMARY OF THE INVENTION

It is a primary object of this invention to provide a manometer which may utilize a principle wherein very light to heavy liquid pressure is measured by differences in volume of a confined gas, compressed by liquid pressure.

Another object of this invention is to provide a manometer which may be readily manipulated by one person to measure various body liquid pressures, such as spinal fluid pressure.

It is a further object of this invention to provide means in a manometer for drawing off a portion of the liquid whose pressure is being measured, for test purposes or other purposes.

Another object of the invention is to provide a compact manometer with a scale of reduced length so that the restricted area to which the meniscus of a normally clear liquid is confined promotes ready location thereof.

The objects of this invention may be achieved by providing a gas-tight, light-pervious channel leading into a gas-tight chamber which preferably is filled with air but which may be filled with another suitable compressible gas, the channel being provided with leakless attachment means whereby it may be connected to a supply of liquid under pressure, the relationship between the volume of the chamber and that of the channel being such that over the pressure range to be measured both gas and liquid are in the channel when their pressures are equalized. Thus, as the pressure to be measured is increased, the ratio of the volume of the channel to the volume of the chamber should be increased. A typical spinal manometer of the invention might have a chamber volume of 8 cubic centimeters and a channel of 0.5 cubic centimeter.

The attachment means employed to introduce liquid under pressure into the manometer for measurement of the liquid pressure includes a conduit having means, such as a needle, for introducing liquid into the conduit at one end. At the other end the conduit has a closure means which includes a means, such as a valve or slit, for opening the conduit to permit drainage or drawing off of liquid from the manometer. The conduit also includes an opening through which liquid may pass from the attachment means into that part of the manometer where the pressure of the liquid may be measured. The attachment means may be employed in accordance with this invention as part of either an open top manometer or a closed manometer.

The products of this invention except for the connectors to the liquid supply and the draw-off device are preferably molded of light-pervious thermoplastic resins such as styrene polymers and copolymers, examples of which are polystyrene and styrene-acrylonitrile copolymer; ionized olefin polymers and copolymers such as ionized polyethylene; acrylic polymers and copolymers such as methyl methacrylate and methyl methacrylate alpha methyl styrene copolymer; cellulose esters and ethers such as ethyl cellulose, cellulose nitrate, cellulose acetate, cellulose propionate and cellulose acetate butyrate; polycarbonates; vinyl polymers and copolymers such as polyvinyl butyral, poly vinylidene chloride, polyvinyl chloride and polyvinyl formal, and chlorinated polyether. This list of suitable resins is not intended to limit the scope of the invention but rather is illustrative. Glass may be substituted if that is desirable.

Obviously the scale of pressures indicated must be calibrated using known fluid pressures.

BRIEF DESCRIPTION OF THE DRAWINGS

Referring now to the drawings,

FIG. 1 represents a partial cross-sectional view of a typical manometer of the invention equipped with a hypodermic needle and a draw-off device.

FIG. 2 is a plan view of the manometer of FIG. 1 with the cap removed.

FIG. 3 is a partial view partly in cross section of the manometer of FIG. 1 showing the operation of the drawing-off device.

FIG. 4 illustrates in substantial cross section a variation of the manometer of FIG. 1 wherein two concentric tubes form the fluid pressure measuring channel and the gas chamber.

FIG. 5 is a further variation of FIG. 1 illustrated in cross section, being a modification of FIG. 4 wherein the gas chamber is not coextensive with the liquid pressure measuring channel and wherein a three-way valve closes the measuring channel or alternatively provides fluid paths whereby specimens may be taken or pressure measured as desired.

FIG. 6 illustrates a further variation partly in cross section of FIG. 1 wherein the gas chamber and the pressure measuring channel have a common wall but are neither concentric nor coextensive.

DESCRIPTION OF THE PREFERRED EMBODIMENTS

Referring once more to the drawings: In FIGS. 1, 2 and 3, illustrative of a preferred embodiment of the invention, the manometer 10 includes a gas-tight container 11 with a gas chamber 11a, capped by a sealed lid 14. A gas passage 15 leads from the chamber 11a to a tube 12 having a liquid and gas channel 12a. Means in the particular example connecting the channel to liquid under pressure include the channel 16 in the tube 17 and the spinal puncture needle 18. The needle in this instance is inserted into the spinal cord and the hollow needle permits spinal fluid under pressure to flow into the channel 12a until the air or other gas formerly filling the chamber 11a and the channels leading to it is compressed to a pressure equal to the spinal fluid pressure. The opening of the channel 16 at the end of the tube 17 opposite to the needle end is closed to the atmosphere. For this purpose, an openable closure means preferably is employed, such as the closure cap 19 fitted over the end portion of the tube 17. The cap illustrated is made of a resilient material such as rubber or plastic. The resilient material of the closure cap is a matter of choice. A portion of the side wall of the cap 19 is slit as at 20. The abutting edges of the slit wall portions normally are compressed together to seal the opening formed by the slit 20 against leakage; see FIG. 1. The closure cap 19 may be opened at slit 20 by deflecting the end of the cap away from the slit as shown in FIG. 3.

In inserting the needle 18 into the spinal cord it is preferred to open the closure means 19 as shown in FIG. 3. The air or gas from channel 16 is then forced therefrom by the spinal fluid as it enters the tube 17 through the needle. The closure means 19 is then closed and the calibrated scale 22 permits the pressure to be read through the light-pervious channel walls. Obviously the scale may be calibrated to read properly with the channel 16 cleared of gas or not cleared of gas. The member 13 and the finger rest 21 provide means for grasping the manometer with the hand without warming the chamber 11a.

If the ambient temperature is within a few degrees of the temperature for which the manometer has been calibrated, insulation of the gas chamber is not particularly necessary. However, temperature fluctuations of 10° or more begin to have a significant effect on the accuracy of the readings and sufficient insulation in addition to the wall member 13 may be necessary or desirable. When a sample of spinal fluid or other liquid whose pressure is being measured is desired, the closure cap 19 is manipulated as shown in FIG. 3 to open the lips of the opening 20 so that liquid may be drawn off.

FIG. 2 illustrates the manometer of FIG. 1 with the sealed lid 14 not yet secured in place. Obviously any other way of sealing the chamber 11a, channel 12a and the passageway 15 may be substituted for the lid 14 without departing from the invention.

In FIG. 4 the manometer 30 comprises an outer tube 31, which provides a chamber 31a within which another tube 32 provides a channel 32a. The channel 32a opens at 35 into the chamber 31a. Except for this opening the chamber is closed at the bottom by the tube 37 and at the top by the cap 34 so that it is otherwise gas-tight. The channel 32a opens at its bottom end into the channel 36 in the tube 37. The channel 36 is closed at one end by the openable closure cap 39 whose drawoff mouth 40 is shown closed. At the other end of the channel 36 is a spinal tap needle 38 or other means for connecting the manometer to a source of liquid whose pressure is to be measured. Either the tube 31 or the tube 32 may be calibrated and marked with a pressure scale.

In FIG. 5 the manometer 50 comprises a tube 52 providing a channel 52a whose open end 55 connects with a tube 51 providing an otherwise gas-tight chamber 51a surrounding the tube 52 and closed with the bottom 53 and the cap 54. The tube 52 opens at its bottom into the three-way valve 56. In the position shown the valve 56 connects the channel 52a to the spinal puncture needle 58 but if it is desired to take a sample the needle may be connected to the draw-off spout 57. The valve may also be turned to hold the fluid in the manometer while the needle is withdrawn or the connection with the liquid whose pressure has been measured is broken.

In FIG. 6 the manometer 60 comprises a tube 62 containing a channel 62a. The tube 62 has a wall partly in common with a tube 61 closed by the bottom 63 and the cap 64 to form the chamber 61a. Cap 64 also closes the tube 62 at its upper end. The chamber 61a is gas-tight except for the passage 65 connecting its top to that of the channel 62a. The tube 62 connects with the tube 67 which contains the channel 66. The latter connects to the openable closure device 69 (with draw-off mouth 70 shown closed) at one end and to the spinal puncture needle 68 or other connecting device at the other end. In operation the tube 62 is calibrated and marked with a suitable pressure scale whereby the height of the liquid meniscus indicates the pressure.

The relationship between channel volume and chamber volume may be calculated utilizing the formula: $P_1V_1=P_2V_2$. Thus if the volumes of the chamber and channel are equal, the pressures measured may vary from one atmosphere to almost two atmospheres absolute. If the volume of the channel is twice the volume of the chamber, the pressures measured may vary from 1 atmosphere to almost 3 atmospheres absolute. Likewise if the channel is one half the volume of the chamber, the pressures which may be measured vary from 1 atmosphere to nearly 1 and ½ atmospheres. Finally if the channel be one-tenth of the volume of the chamber, the pressures which may be measured vary from one atmosphere to nearly 1.1 atmospheres.

The closed manometers of this invention preferably are used with the entrance to the channel at the bottom thereof but when pressures to be measured are great enough so that the liquid fills the channel and flows into the chamber, the manometer may be inverted when this occurs and a properly calibrated scale may be placed reading from what is usually the top of the chamber. Such extreme pressures are not usually encountered, however, and specially reinforced manometers should be prepared when they are.

In the drawings and specification there have been set forth preferred embodiments of the invention and, although specific terms are employed, they are used in a generic and descriptive sense only and not for purposes of limitation, the scope of the invention being defined in the claims.

I claim:

1. A manometer for measuring liquid pressure comprising:
   a. a channel having an opening therein through which said liquid enters and fills at least part of said channel;
   b. attachment means for connecting said channel through said opening to liquid under pressure, said attachment means including a conduit communicating with said opening intermediate the ends of the conduit and providing a path of flow for said liquid into said channel wherein the pressure of said liquid will be indicated by the amount of travel of the liquid in said channel;
   c. means adjacent one end of the conduit for introducing the liquid into the conduit; and
   d. openable closure means adjacent the other end of the conduit for selectively closing the other end of the conduit or opening the other end of the conduit, said closure means being constructed and arranged to permit drainage of liquid from the manometer through the closure means when in conduit opening condition.

2. A manometer for measuring liquid pressure comprising:
   a. a chamber and a channel interconnected with each other through a passageway to provide for displacement of gas in the channel to the chamber by liquid entering said channel under pressure, said channel having an opening therein through which said liquid enters said channel, said opening being spaced from said passageway to permit said fluid to enter and fill at least a major portion of said channel without entering said passageway;
   b. attachment means for connecting said channel through said opening to liquid under pressure, said attachment means including a conduit communicating with said opening intermediate the ends of the conduit and providing a path of flow for said liquid into said channel whereby liquid entering said channel displaces gas therefrom into said chamber through said passageway and compresses the gas in said channel, passageway and chamber, the amount of travel of said liquid in said channel indicating the pressure of the liquid;
   c. means adjacent one end of the conduit for introducing the liquid into the conduit; and
   d. openable closure means adjacent the other end of the conduit for selectively closing the other end of the conduit or opening the other end of the conduit, said closure means being constructed and arranged to permit drainage of liquid from the manometer through the closure means when in conduit opening condition.

3. The manometer of claim 2 wherein said means for introducing said liquid comprises a needle.

4. The manometer of claim 2 wherein said construction and arrangement of the closure means is provided by a slit therein, said slit normally having the opposed edges thereof abutting so as to prevent leakage of fluid but which forms a drainage opening for liquid from said manometer upon distortion of said closure means to separate the abutting opposite edges of said slit.

5. The manometer of claim 4 wherein the chamber and the channel are positioned beside each other substantially parallel along their longitudinal axes.

6. The manometer of claim 4 wherein said chamber surrounds at least that part of the channel which connects to said passageway, said chamber being closed above said channel and below said passageway such that said chamber is gas-tight except for said passageway into the channel.

7. The manometer of claim 6 wherein said chamber is closed below said passageway against the wall of said channel.

8. The manometer of claim 4 wherein the wall of the chamber is partly in common with the wall of the channel.

9. The manometer of claim 2 wherein said passageway is an opening in said channel, said opening connecting the channel to the chamber.

10. The manometer of claim 9 wherein said chamber surrounds at least that part of the channel which includes said opening connecting the channel to the chamber, said chamber being closed above said channel and below said opening such that said chamber is gas-tight except for said opening in the channel.

11. The manometer of claim 10 wherein said chamber is closed below said opening against the wall of said channel.

12. The manometer of claim 2 wherein the chamber and the channel are positioned beside each other substantially parallel along their longitudinal axes.

13. The manometer of claim 12 wherein the wall of the chamber is partly in common with the wall of the channel.

14. A manometer for measuring liquid pressure comprising:
   a. a chamber and a channel interconnected with each other through a passageway to provide for displacement of gas in the channel to the chamber by liquid entering said channel under pressure, said channel having an opening therein through which said liquid enters said channel, said opening being spaced from said passageway to permit said fluid to enter and fill at least a major portion of said channel without entering said passageway,
   b. attachment means for connecting said channel through said opening to liquid under pressure, said attachment means including a conduit communicating with said opening intermediate the ends of the conduit and providing a path of flow for said liquid into said channel whereby liquid entering said channel displaces gas therefrom into said chamber through said passageway and compresses the gas in said channel passageway and chamber, the amount of travel of said liquid in said channel indicating the pressure of the liquid,
   c. means adjacent one end of the conduit for introducing the liquid into the conduit,
   d. openable closure means adjacent the other end of the conduit for selectively closing the other end of the conduit or opening the other end of the conduit, said closure means being constructed and arranged to permit drainage of liquid from the manometer through the closure means when in conduit opening condition, and
   e. said chamber surrounding at least said passageway and part of the channel, said chamber being closed above said channel and below said passageway such that said chamber is gas-tight except for said passageway connecting to the channel.

15. The manometer of claim 14 wherein said chamber is closed against the wall of said channel below said passageway.

* * * * *